(12) United States Patent
Mullally et al.

(10) Patent No.: US 7,163,187 B2
(45) Date of Patent: Jan. 16, 2007

(54) NON-SLIDING VALVE

(75) Inventors: Michael J. Mullally, Clifton Springs, NY (US); Paul E. Welker, Clifton Springs, NY (US)

(73) Assignee: Seal Tech, Inc., Clifton Springs, NY (US)

( * ) Notice: Subject to any disclaimer, the term of this patent is extended or adjusted under 35 U.S.C. 154(b) by 195 days.

(21) Appl. No.: 10/953,648

(22) Filed: Sep. 29, 2004

(65) Prior Publication Data

US 2006/0065872 A1    Mar. 30, 2006

(51) Int. Cl.
*F16K 31/02* (2006.01)

(52) U.S. Cl. .................... 251/129.16; 251/337
(58) Field of Classification Search ........... 251/129.16, 251/129.15, 337
See application file for complete search history.

(56) References Cited

U.S. PATENT DOCUMENTS

| | | | | |
|---|---|---|---|---|
| 2,588,137 | A * | 3/1952 | Marvin | 251/129.16 |
| 2,631,612 | A * | 3/1953 | Buescher | 251/129.16 |
| 3,921,670 | A * | 11/1975 | Clippard et al. | 251/129.15 |
| 4,196,751 | A * | 4/1980 | Fischer et al. | 251/129.16 |
| 4,250,924 | A | 2/1981 | Sakakibara et al. | 137/868 |
| 4,463,969 | A * | 8/1984 | Harrison | 251/129.16 |
| 4,852,605 | A * | 8/1989 | Gouhier | 251/129.16 |
| 4,951,916 | A * | 8/1990 | Kanameda et al. | 251/129.16 |
| 5,054,691 | A * | 10/1991 | Huang et al. | 251/129.16 |
| 5,662,461 | A | 9/1997 | Ono | 417/418 |
| 5,924,674 | A * | 7/1999 | Hahn et al. | 251/129.16 |
| 6,068,010 | A * | 5/2000 | Reinicke | 251/129.16 |
| 6,220,569 | B1 * | 4/2001 | Kelly | 251/129.08 |
| 6,227,240 | B1 * | 5/2001 | Wu et al. | 251/337 |
| 6,415,817 | B1 * | 7/2002 | Krimmer et al. | 251/129.16 |
| 6,546,945 | B1 | 4/2003 | Ishigaki et al. | 137/15.18 |
| 6,764,061 | B1 * | 7/2004 | Haeberer et al. | 251/129.16 |
| 6,820,651 | B1 * | 11/2004 | Seuret et al. | 251/129.16 |
| 2002/0134957 | A1 | 9/2002 | Paessler et al. | 251/129.15 |
| 2004/0021107 | A1 | 2/2004 | Kimura et al. | 251/65 |

FOREIGN PATENT DOCUMENTS

EP    1 350 999 A1 * 10/2003

* cited by examiner

*Primary Examiner*—John Bastianelli
(74) *Attorney, Agent, or Firm*—Brown & Michaels, PC

(57) ABSTRACT

A solenoid valve moves an armature back and forth between valve open and valve closed positions without the armature having any sliding engagement with any fixed valve part. This is accomplished by supporting the armature with a spring having one periphery engaging a fixed valve surface and another periphery engaging the armature so that armature movement causes flexure of the spring, but no sliding contact. This helps prevent generation of dirt within the valve and ensures accurate armature movement to make the valve durable and reliable. Springs in both washer and cylindrical helical shapes can accomplish this.

18 Claims, 3 Drawing Sheets

VALVE SHOWN OPEN

VALVE SHOWN CLOSED

NON-SLIDING VALVE

TECHNICAL FIELD

Solenoid-controlled valves for fluids

BACKGROUND

Meeting the most challenging reliability demands requires solenoid valves to minimize any contamination particulates being developed within the valve during repeated actuations. For example, solenoid valves must be especially free of particles to be deployed in space vehicles and satellites where valve performance must be highly reliable and valve failure can be disastrously expensive.

This invention involves recognition of ways that particles are created during operation of solenoid valves, and ways to avoid such particle contamination. Besides avoiding valve failures from internal contamination, the invention aims at more reliable valve operation accomplished by especially accurate valve opening and closing motions. While combining particle avoidance and accurate movements, the invention also aims at ensuring valve durability and dependability at an affordable price.

SUMMARY

The inventive valve avoids internal particle generation by avoiding sliding contact between a movable armature and fixed valve surfaces during valve operation. Experiments have established that sliding contact between valve parts produces tiny contaminant particles that can migrate to sensitive internal regions of the valve and cause leakage or mal-performance. The invention thus aims at a cleaner and more reliably operating valve by eliminating such sliding contact.

In addition to eliminating contamination from sliding contact, the invention also aims at consistently moving a valve closing puck into engagement with a valve seat so that contact between the puck and the seat always occurs in a single region of the puck. Accomplishing this ensures that leakage does not occur from eccentric seating ring engagement between the puck and the valve seat.

A spring support and guidance system moves an armature of a solenoid clear of any sliding contact with valve parts. The armature preferably carries a valve-closing puck and is supported by a spring system to move linearly and axially without moving radially. The armature can engage a non-magnetic stop when moved to a fully open position by the solenoid, but such engagement does not involve any sliding contact and does not produce noticeable particles.

One spring system for accomplishing this uses a washer shaped annulus that connects to an armature at an internal periphery and connects to a valve body at an external periphery. Such an arrangement ensures that the armature cannot move radially, and is able to move only axially during valve opening and closing. Another spring support embodiment uses a generally helical cylindrical spring flanged at one end to fit a fixed valve surface and flanged at another end to fit to and support the movable armature. Helical turns of the spring between the flanged ends flex to allow the armature to move axially but not radially, with neither the spring nor the armature involved in any sliding contact with any valve surface.

DRAWINGS

DETAILED DESCRIPTION

Figure 2:
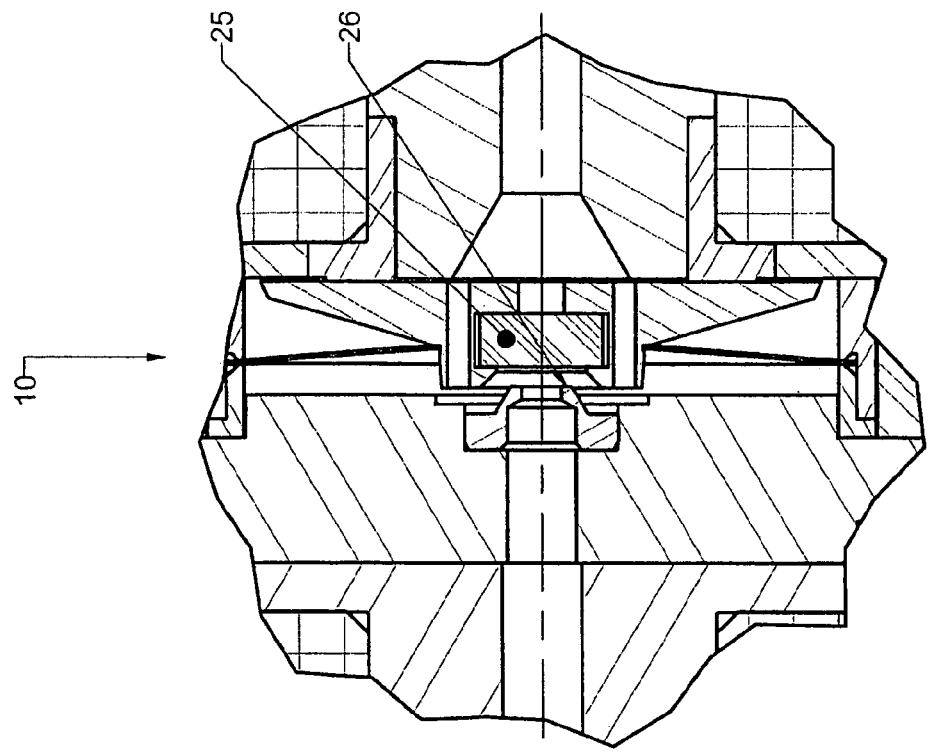
FIG. 2 is a fragmentary cross-sectional view similar to the view of FIG. 1, showing a valve open position.
Figure 1:
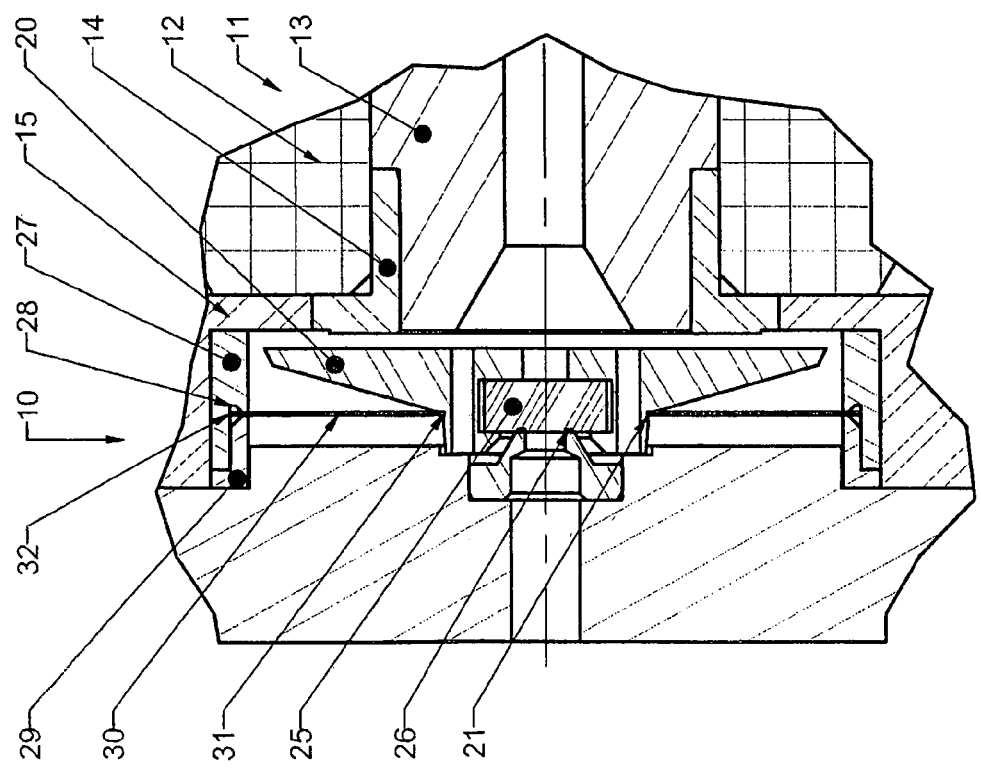
FIG. 1 is a fragmentary cross-sectional view of a preferred embodiment of the inventive non-sliding valve shown in a closed valve position.

One preferred embodiment of a non-sliding valve 10, as shown in FIGS. 1 and 2, includes armature 20 supported by spring 30 and carrying valve closing puck 25 and solenoid 11 formed of coil 12, non magnetic flux stop 13 and non-magnetic core or 5 abutment 14. A flux path transmitted from coil 12 through solenoid body 15 to a periphery of armature 20 draws armature 20 against stop 14 to open valve 10, as shown in FIG. 2.

Figure 3:
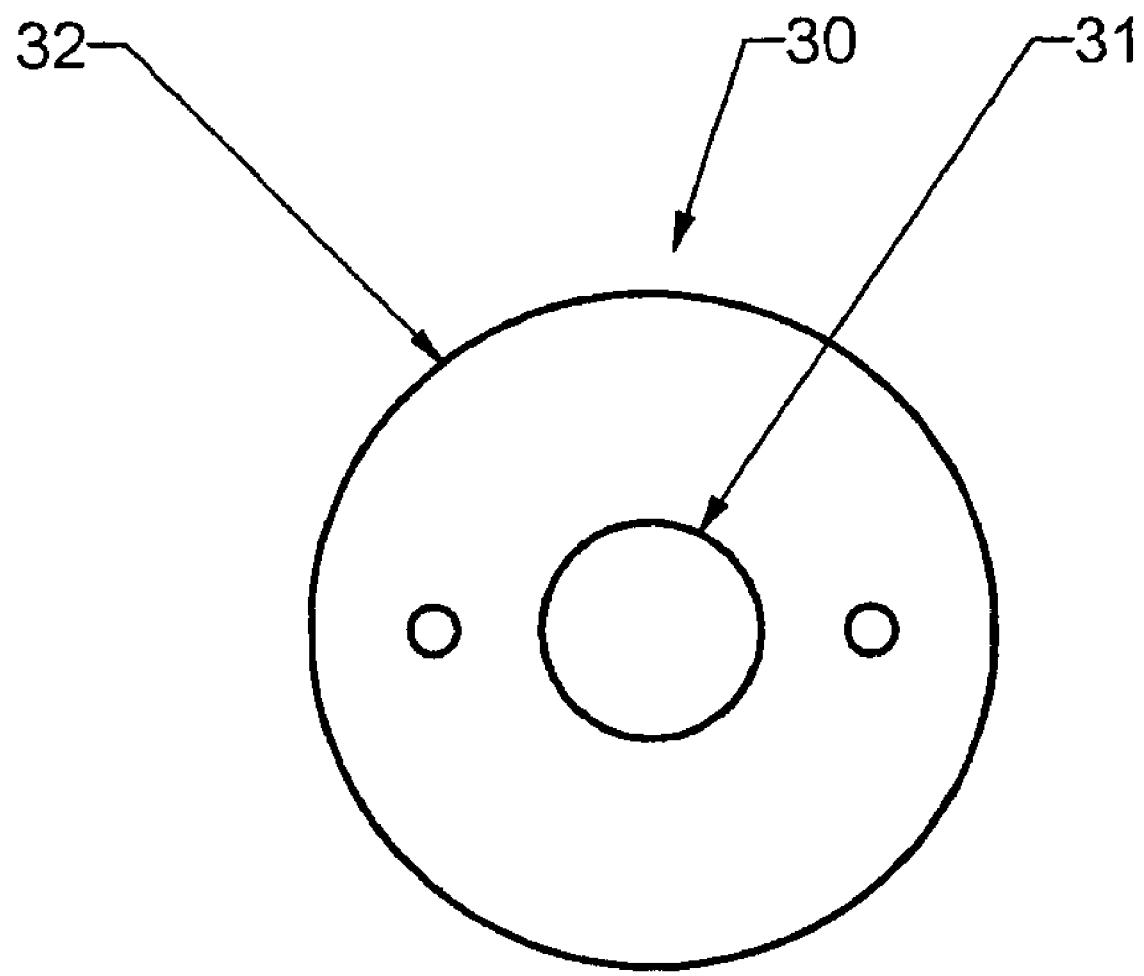
FIG. 3 is a plan view of a spring support used in FIGS. 1 and 2.

In the position of FIG. 1, puck 25, which is elastomeric or compressible, engages a valve seat 26 in valve body 27 to close valve 10. Armature 20 moves linearly and axially toward and away from valve seat 26, without engaging valve parts in any sliding contact. Spring 30, which makes this possible, is shaped as a plane annular disk resembling a washer, as shown in FIG. 3. An internal or inside diameter 31 of a central opening in spring 30 engages armature 20, and an outside diameter or outer periphery 32 is seated in a groove 28 in valve body 27.

In the position shown in FIG. 1, spring 30 is biased to press armature 20 and puck 25 against valve seat 26 in a normally closed valve position. When solenoid 11 actuates, it draws armature 20 to the open valve position shown in FIG. 2 in which puck 25 moves away from valve seat 26 and allows fluid flow.

The connection between spring 30 and armature 20 is preferably made by a close tolerance fitting of an internal diameter 31 of spring 30 into groove 21 in armature 20. This is preferably accomplished by chilling armature 20 to a low temperature, while keeping spring 30 at a higher temperature so that the ID 31 of spring 30 can be snapped into groove 21 for a snug fit when armature 20 and spring 30 reach the same temperature.

The outer perimeter 32 of spring 30 is preferably secured in valve body groove 28 by means of a spacer ring 29 having a press fit within valve body part 27. As spring 30 flexes between the closed valve position of FIG. 1 and the open valve position of FIG. 2, its outer perimeter 32 moves slightly within groove 28, but this movement has been shown by experiment not to produce any significant contamination particulate. The movement is very slight and is confined within a substantially closed groove 28.

The valve closing bias of spring 30 is affected by how tightly ring spacer 29 encloses the outer perimeter 32 of spring 30 within groove 28. The correct adjustment of this is preferably accomplished by machining ring spacer 29 until its press fit into valve body part 27 produces the correct clearance for groove 28 to give spring 30 its closing bias. This closing bias is also selected to be overcome by solenoid 11 when actuated to open valve 10.

The movement of armature 20 against the fixed, non-magnetic abutment 14 is a non-sliding, tapping motion that essentially does not produce particles. Such a tapping motion contrasts significantly with a sliding motion of an armature or its guide against a fixed valve surface. The lack of particles from a non-sliding motion has been established by tests involving many millions of openings for valve 10.

The geometry of spring 30 ensures that armature 20 cannot depart from a linear axial movement toward and away from valve seat 26. Such movement is also clear of any sliding contact with any valve part to ensure particle-free and reliable operation. This arrangement also brings puck 25 accurately back to the same engagement with valve seat 26 for each subsequent closed valve position so that puck 25 and seat 26 always engage in the same circular ring. This ensures that leakage does not develop between puck 25 and valve seat 26 from eccentric and overlapping engagements.

Figure 4:
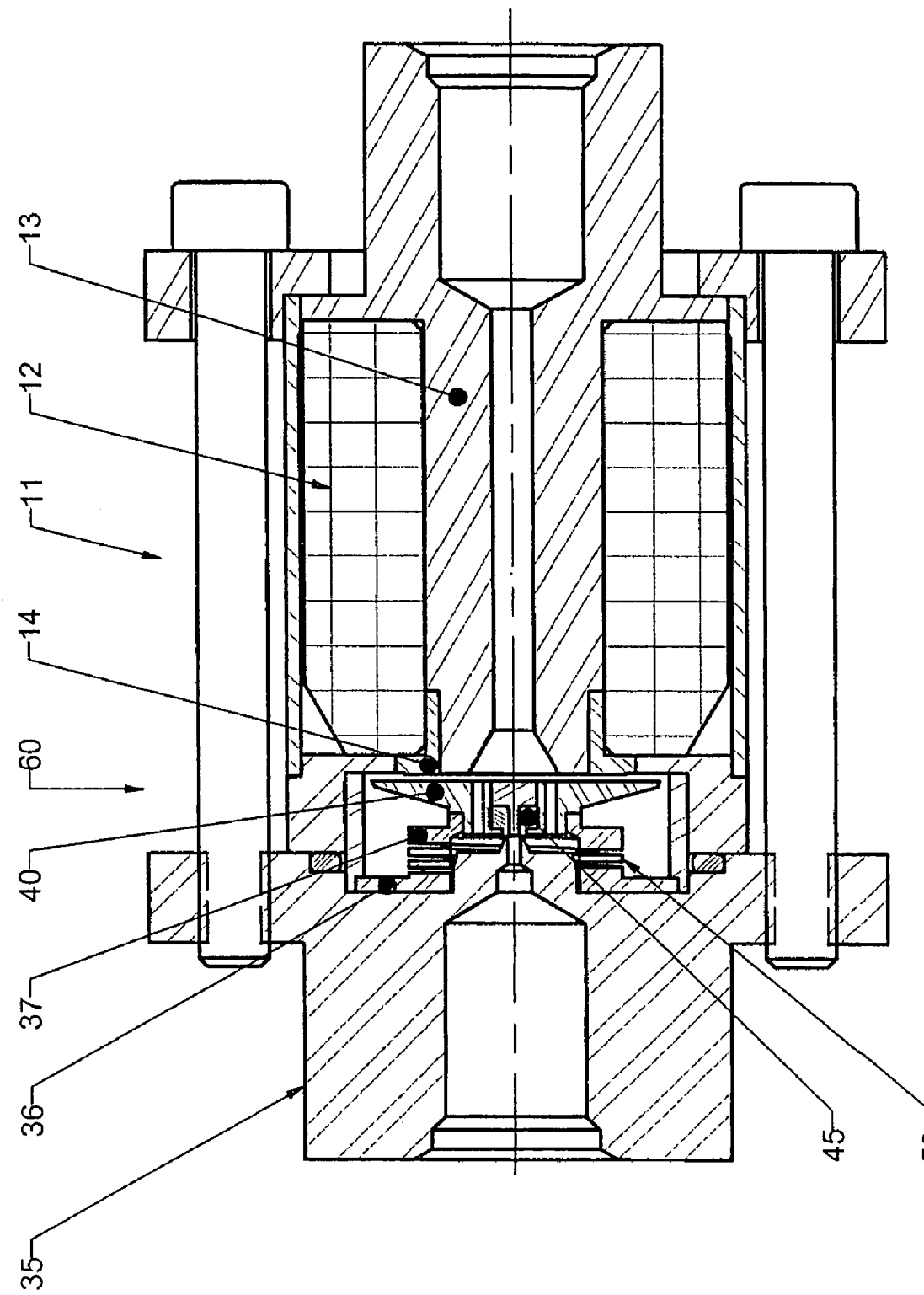
FIG. 4 is a fragmentary cross-sectional view of a helical spring embodiment of the invention showing the valve in a closed valve position.

Another preferred embodiment using a cylindrically shaped helical spring 50 to support a solenoid armature 40 is shown in FIG. 4. Except for armature 40, spring 50, and puck 45, parts of solenoid 11, including coil 12, flux stop 13, and abutment core 14 are all as previously described for the embodiment of FIGS. 1 and 2.

The difference in the embodiment of FIG. 4 is the use of a helical coil spring 50, rather than a washer shaped spring such as shown in FIGS. 1 and 2. Helical coil spring 50 is preferably machined of a piece of spring steel and formed in a generally cylindrical shape with end flanges to fit armature 40 and valve body 35. Spring 50 can also have its fixed and moveable ends welded in place, but since it is being made of machined steel, it is efficient to form a fixed flange 36 fitted to valve body 35 and a movable end flange 37 fitted to and supporting armature 40. Such flanges can be shaped in many different ways.

As explained for valve 10 of FIGS. 1 and 2, valve 60 of FIG. 4 moves armature 40 axially to pull puck 45 away from valve seat 46 without armature 40 or puck 45 departing from a linear axial movement. Also, armature 40 contacts only spring 50 and abutment 14 and does not slide in contact with any fixed valve surface during opening and closing movement. Valve 60 thus accomplishes the same goals of particle-free and accurate operation as described for valve 10.

Many different arrangements of disk and helical springs can be arranged to achieve the same advantages as explained for the illustrated valves. Also different materials and solenoids can be used to adapt the invention to different applications.

What is claimed is:

1. A spring support arrangement for a solenoid armature carrying a valve-closing seal, the arrangement comprising:
   a generally cylindrical coil spring having flanged ends, one of which is connected to the armature and another of which is connected to a body of the valve;
   the armature having no sliding contact with valve surfaces as the armature moves away from and toward a closed valve position;
   the spring being a single piece of steel formed so that a helical coil of the spring allows axial movement of the armature while resisting radial movement of the armature; and
   the helical coil of the spring being arranged to avoid sliding contact with valve body surfaces as the armature moves.

2. The spring support arrangement of claim 1 wherein the single piece of steel includes the flanged ends and the helical coils.

3. The spring support arrangement of claim 1 wherein the seal is formed of a compressible material that is compressed in a recess in the armature.

4. A solenoid armature support and guidance system for a valve, the system comprising:
   a spring providing both support and guidance for the armature;
   the spring holding the armature concentrically of a solenoid and biasing the armature toward a seat for the valve;
   the spring allowing the armature to move axially of the solenoid and the valve seat;
   the spring restraining the armature from deviation from the axial movement;
   the spring being connected to the armature and to a body of the valve;
   the spring holding the armature clear of sliding contact with any valve surface during axial movement of the armature;
   magnetic flux generated by the solenoid acting on a periphery of the armature to cause the axial movement of the armature;
   the armature carrying a seal of compressible material that engages the valve seat to close the valve;
   the spring extends axially from the armature to the valve body: and
   the spring is formed of a single piece of steel having a cylindrical helical coil between a pair of opposite end flanges that are fitted respectively to the armature and the valve body.

5. The system of claim 4 wherein the helical coils remain clear of any sliding contact with the valve body.

6. The system of claim 4 wherein the seal is compressed into a recess in the armature.

7. The system of claim 4 wherein the spring ensures that the seal repeatedly engages the seat in a single line of engagement.

8. A solenoid valve comprising:
   an armature supported by a generally cylindrical helical coil spring to move without any sliding contact with any valve surfaces as the armature travels between closed and open valve positions;
   the spring biasing the armature toward the closed valve position, and a solenoid moving the armature to the open valve position;
   the spring being concentric with the armature and configured to hold the armature against radial movement while allowing the armature to move axially of the solenoid; and
   the spring coil moving clear of any sliding contact with any valve surfaces as the armature moves.

9. The valve of claim 8 wherein the armature has a seal recess ringed by an inturned lip, and a compressible seal is compressed in the recess under the inturned lip.

10. The valve of claim 8 wherein the spring is formed of a single piece of steel.

11. The valve of claim 8 wherein the spring includes opposite end flanges fitted respectively to the armature and to the valve body.

12. A system supporting and allowing movement of an armature of a solenoid valve, the system comprising:
    a spring extending axially from a body of the valve to the armature to support and guide the armature for movement between open and closed valve positions;
    the spring biasing the armature toward the closed valve position;
    a solenoid being actuatable to draw the armature to the open valve position;
    the spring holding the armature clear of any sliding contact with valve surfaces during its movement between the closed and open valve positions;
    the spring being configured as a cylindrical helical coil allowing only linear movement of the armature;

the spring configuration preventing any radial movement of the armature; and the spring avoids any sliding contact with any valve surface during movement of the armature.

13. The valve of claim 11 wherein the spring is a single piece of steel.

14. The valve of claim 12 wherein the armature is formed with a seal recess, and a seal is compressed in the recess.

15. The valve of claim 13 wherein the spring includes opposite end flanges fitted respectively to the armature and to the valve body.

16. A support for an armature of a solenoid valve, the support comprising:

a generally cylindrical spring formed of a single piece of steel a central region of the spring formed as a helical coil allowing the armature to move axially of the spring and constraining the armature from moving radially of the spring;

one end of the spring having a flange fitted to a body of the valve;

another end of the spring having a flange fitted to the armature; and the armature having no sliding contact with the valve body during movement between open and closed positions.

17. The support of claim 16 wherein the armature carries a valve closing seal.

18. The support of claim 17 wherein the seal is formed of a compressible material that is compressed under a lip of a recess in the armature.

* * * * *